US008767612B2

(12) United States Patent
Kobayashi

(10) Patent No.: US 8,767,612 B2
(45) Date of Patent: Jul. 1, 2014

(54) RADIO COMMUNICATION APPARATUS AND RADIO COMMUNICATION CONTROL METHOD

(75) Inventor: Hirokazu Kobayashi, Tokyo (JP)

(73) Assignee: Panasonic Corporation, Osaka (JP)

( * ) Notice: Subject to any disclaimer, the term of this patent is extended or adjusted under 35 U.S.C. 154(b) by 155 days.

(21) Appl. No.: 13/388,429

(22) PCT Filed: Mar. 23, 2011

(86) PCT No.: PCT/JP2011/001697
§ 371 (c)(1),
(2), (4) Date: Feb. 1, 2012

(87) PCT Pub. No.: WO2011/158407
PCT Pub. Date: Dec. 22, 2011

(65) Prior Publication Data
US 2012/0127920 A1     May 24, 2012

(30) Foreign Application Priority Data

Jun. 18, 2010  (JP) ................................. 2010-139641

(51) Int. Cl.
*H04B 7/14*      (2006.01)
*H04L 12/413*   (2006.01)

(52) U.S. Cl.
USPC .......................................... 370/315; 370/445

(58) Field of Classification Search
CPC .................................................... H04B 7/2606
USPC ................................................. 370/315, 445
See application file for complete search history.

(56) References Cited

U.S. PATENT DOCUMENTS

| 2003/0189948 A1* | 10/2003 | Sashihara .................... 370/445 |
| 2004/0171400 A1 | 9/2004 | Rosen |
| 2007/0287456 A1 | 12/2007 | Shimizu |
| 2009/0170546 A1 | 7/2009 | Nishida |
| 2010/0091698 A1* | 4/2010 | Aibara et al. ................ 370/315 |

FOREIGN PATENT DOCUMENTS

| JP | 2005-514802 | 5/2005 |
| JP | 2006-067244 | 3/2006 |
| JP | 2007-329696 | 12/2007 |
| JP | 2008-072536 | 3/2008 |
| JP | 4212534 | 1/2009 |
| JP | 2010-093612 | 4/2010 |
| JP | 2010-114809 | 5/2010 |

OTHER PUBLICATIONS

International Search Report dated May 17, 2011.

(Continued)

*Primary Examiner* — Ian N Moore
*Assistant Examiner* — Kiet Tang
(74) *Attorney, Agent, or Firm* — Dickinson Wright PLLC

(57) ABSTRACT

Provided area wireless communication apparatus and wireless communication control method, which are capable of preventing concentration of the data delivery requests from the wireless communication terminal apparatuses and thus reducing power consumption occurring when the wireless communication terminal waits for data delivery. AID managing section (201) divides the wireless LAN terminals associated with the access point into a plurality of groups and manages the grouped wireless LAN terminals using the group AID, and extension TIM generating section (207) generates extension TIM indicating that data addressed to the wireless LAN terminal is stored for each group. Extension TIM generating section (207) transmits the extension TIM to the subordinate wireless LAN terminal at timing shifted for each group.

4 Claims, 11 Drawing Sheets

(56) References Cited

OTHER PUBLICATIONS

"IEEE Standard for Information technology—Telecommunications and information exchange between systems—Local and metropolitan area networks—Specific requirements, Part 11: Wireless LAN Medium Access Control (MAC) and Physical Layer (PHY) Specifications," IEEE Computer Society, Std 802.11. Jun. 12, 2007, pp. 1-1184.

* cited by examiner

| TERMINAL ID | AID |
|---|---|
| TERMINAL 1 | AID1 |
| TERMINAL 2 | AID2 |
| TERMINAL 3 | AID3 |
| TERMINAL 4 | AID4 |
| TERMINAL 5 | AID5 |
| TERMINAL 6 | AID6 |
| TERMINAL 7 | AID7 |

FIG.3

| TERMINAL ID | AID | GAID |
|---|---|---|
| TERMINAL 1 | AID1 | |
| TERMINAL 4 | AID4 | GAID1 |
| TERMINAL 7 | AID7 | |
| TERMINAL 1 | AID1 | |
| TERMINAL 2 | AID2 | GAID2 |
| TERMINAL 5 | AID5 | |
| TERMINAL 1 | AID1 | |
| TERMINAL 3 | AID3 | GAID3 |
| TERMINAL 6 | AID6 | |

FIG.4

RADIO COMMUNICATION APPARATUS AND RADIO COMMUNICATION CONTROL METHOD

TECHNICAL FIELD

The present invention relates to a wireless communication apparatus and wireless communication control method that relays communication between a plurality of communication terminal apparatuses.

BACKGROUND ART

Wireless communication systems have been in wide use as a data communication means because of such convenience that communication terminals used by users are portable and thus the places to use them are not restricted. Mobile communication terminals are powered by a battery, so that a power saving capability is required.

As one example of a wireless communication system, there is a wireless LAN system specified by IEEE 802.11. In the wireless LAN system, an infrastructure mode and an ad-hoc mode are provided so as to perform communication with another wireless communication apparatus. The ad-hoc mode refers to a mode in which wireless LAN terminals directly transmit and receive data. Meanwhile, the infrastructure mode refers to a mode in which a plurality of wireless LAN terminals are connected to a wireless communication apparatus called an access point, and the wireless LAN terminals performs data transmission and reception via the access point.

The wireless LAN system conforming to the IEEE 802.11 scheme specifies a specification related to a power saving mode for controlling power consumption (for example, see Non Patent Literature 1). Further, it is known that the wireless LAN terminal has two types of modes: an awake mode capable of receiving data; and a doze mode which operates in a low power without transmission and reception.

Here, when the access point receives data addressed to a wireless LAN terminal associated with an own apparatus, the access point once stores the data in a communication buffer. The access point transfers the data when the wireless LAN terminal which is the destination of the data is operating in the awake mode. Meanwhile, when the wireless LAN terminal is operating in the doze mode, the access point transmits a beacon including an element called a traffic indication map (TIM). Specifically, the access point sets a corresponding bit to a TIM indicating that data addressed to a corresponding wireless LAN terminal is buffered, and transmits a beacon including the TIM.

The wireless LAN terminal operating in the power saving mode transitions to the doze mode according to an interval of a beacon frame periodically transmitted by the access point. The wireless LAN terminal that has transitioned to the doze mode receives the beacon including the TIM indicating that there is data addressed to the wireless LAN terminal. The wireless LAN terminal that has received the beacon including the TIM transmits a data delivery request to the access point, notifies the access point of the fact that it has transitioned to the awake mode, and then receives the data. The wireless LAN terminal in the awake mode transitions to the doze mode again when there is no data addressed to the wireless LAN terminal.

Meanwhile, when there is a plurality of wireless LAN terminals associated with to the access point, the access point notifies of the fact that there is buffer data addressed to the plurality of wireless LAN terminal by the TIM. Due to the notice to the plurality of wireless LAN terminals, data delivery requests from the wireless LAN terminals operating in the doze mode are concentrated, and the number of wireless LAN terminals operating in the awake mode to acquire a transmission right increases. For this reason, there is a problem in that the power consumption of these wireless LAN terminals increases.

In this regard, in order to solve the above problem, for example, Patent Literature 1 discloses a technique of allowing wireless LAN terminals to independently set a beacon acquisition period and preventing data delivery requests from wireless LAN terminals from being concentrated at a certain timing.

Further, Patent Literature 2 discloses a technique of notifying of the presence of buffer data only when a determination criterion according to a data type is satisfied when an access point receives data addressed to a subordinate wireless LAN terminal.

CITATION LIST

Patent Literature

PTL 1
Japanese Patent Application Laid-Open No. 2007-329696
PTL 2
Japanese Patent Application Laid-Open No. 2006-67244

Non Patent Literature

NPTL 1
IEEE Std 802.11-2007, Part11: Wireless LAN Medium Access Control (MAC) and Physical Layer (PHY) Specifications, Jun. 12, 2007, P425-436.

SUMMARY OF INVENTION

Technical Problem

However, in the technique disclosed in Patent Literature 1, since the wireless LAN terminals independently set the beacon acquisition period, it is not possible to guarantee to prevent the concentration of the data delivery requests, so that the data delivery requests still concentrates at a certain timing. In addition, in the technique disclosed in Patent Literature 1, since the wireless LAN terminals independently set the beacon acquisition period, when the wireless LAN terminals associated with the same access point communicate, it is not possible to operate the two terminals in the awake mode at the same time. For these reasons, in the technique disclosed in Patent Literature 1, there is a problem in that a delay occurs due to buffering of data.

Further, in the technique disclosed in Patent Literature 2, each wireless LAN terminal needs to have a notification determination criterion, and the access point needs to perform communication with the wireless LAN terminals so as to acquire the determination criterion, so that power consumption is required for the transmission and reception for acquiring the determination criterion. Further, in the technique disclosed in Patent Literature 2, a server for managing the determination criteria is required, so that a system configuration is complicated. In addition, in the technique disclosed in Patent Literature 2, when a lot of data requiring the notification process is buffered, a problem still remains in that the data delivery requests from the wireless LAN terminals returning from the doze mode may be concentrated.

It is an object of the present invention to provide a wireless communication apparatus and wireless communication control method, which prevent concentration of the data delivery requests from the wireless communication terminal apparatuses and thus reduce power consumption occurring when the wireless communication terminal goes on standby for data, delivery.

Solution to Problem

A wireless communication apparatus according to the present invention is a wireless communication apparatus that relays communication between a wireless communication terminal apparatus and another communication terminal apparatus, and employs a configuration including a group managing section that divides the wireless communication terminal apparatuses associated with the wireless communication apparatus into a plurality of groups and manages the grouped wireless communication terminal apparatuses, a storage section that stores data addressed to the wireless communication terminal apparatus acquired from the another communication terminal apparatus, a data storage notification signal generating section that generates a data storage notification signal indicating that data addressed to the wireless communication terminal is stored for each group, and a transmitting section that transmits the generated data storage notification signal to the wireless communication terminal apparatus at timing shifted for each the group.

A wireless communication control method according to the present invention is a wireless communication control method of a wireless communication apparatus that relays communication between a wireless communication terminal apparatus and another communication terminal apparatus, and includes a group managing step of dividing the wireless communication terminal apparatuses associated with the wireless communication apparatus into a plurality of groups and managing the grouped wireless communication terminal apparatuses, a storage step of storing data addressed to the wireless communication terminal apparatus, acquired from the another communication terminal apparatus, a data storage notification signal generating step of generating a data storage notification signal indicating that data addressed to the wireless communication terminal is stored for each group, and a transmitting step of transmitting the generated data storage notification signal to the wireless communication terminal apparatus at timing shifted for each of the group.

Advantageous Effects of Invention

According to the present invention, it is possible to prevent concentration of the data delivery requests from the wireless communication terminal apparatuses, and reduce power consumption occurring when the wireless communication terminal goes on standby for data delivery.

BRIEF DESCRIPTION OF DRAWINGS

FIG. 3 illustrates an example of an AID management table;

FIG. 4 illustrates an example of a group AID management table;

DESCRIPTION OF EMBODIMENTS

Hereinafter, embodiments of the present invention will be described in detail with reference to the accompanying drawings.

Embodiments

Figure 1:
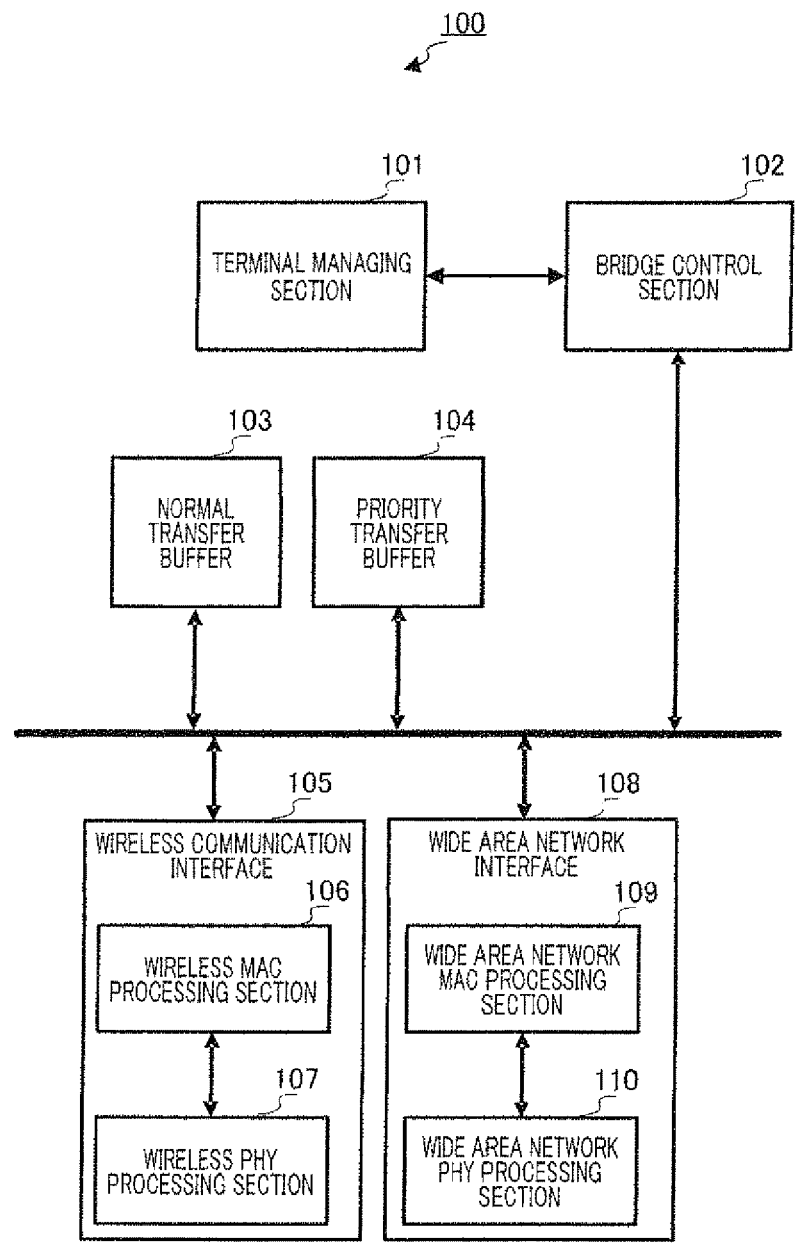
FIG. 1 is a block diagram illustrating a configuration of a wireless communication apparatus according to an embodiment of the present invention.

FIG. 1 is a block diagram illustrating a configuration of wireless communication apparatus (hereinafter, referred to as "access point") 100 according to an embodiment of the present invention.

In FIG. 1, access point 100 includes terminal managing section 101, bridge control section 102, normal transfer buffer 103, priority transfer buffer 104, wireless communication interface 105, and wide area network interface 108.

Terminal managing section 101 manages wireless LAN terminals that have associated with access point 100. Further, terminal managing section 101 generates a data storage notification signal (hereinafter, referred to as "traffic indication map (TIM)") indicating that data addressed to a subordinate wireless LAN terminal is stored. Then, terminal managing section 101 outputs the generated TIM to bridge control section 102.

Further, terminal managing section 101 accepts an association request from the subordinate wireless LAN terminal. Terminal managing section 101 allocates an association identifier (AID) to the wireless LAN terminals that accepts association request, and manages the wireless LAN terminals. Further, terminal managing section 101 outputs the AIDs to bridge control section 102. The details of terminal managing section 101 will be described later.

Bridge control section 102 performs a process of storing a data frame arriving at wireless communication interface 105 or wide area network interface 108 in normal transfer buffer 103 or priority transfer buffer 104. Further, bridge control section 102 performs a process of reading out the data frame from normal transfer buffer 103 or priority transfer buffer 104 and transmitting the read data frame via wireless communication interface 105 or wide area network interface 108. That is, bridge control section 102 performs a so-called bridge process.

Further, bridge control section 102 performs a process of including the TIM output from terminal managing section 101 in a beacon and transmitting the beacon via wireless communication interface 105 as well as processing of the data frame.

In addition, when the association request from the wireless LAN terminal has been accepted, bridge control section 102 includes the AID output from terminal managing section 101 in an association response frame, and instructs wireless communication interface 105 to transmit the association response frame. Wireless communication interface 105 performs a process conforming to a specified communication protocol or the like.

Wireless communication interface 105 or wide area network interface 108 receives a data frame. Bridge control section 102 that is notified of reception of the data frame stores the received data frame in normal transfer buffer 103 when it is determined that the data frame needs to be transferred by normal transfer. Here, the normal transfer refers to transfer of a data frame in which a real time property is not required, that is, transfer in which priority transfer is not necessary.

Wireless communication interface 105 or wide area network interface 108 receives a data frame. Bridge control section 102 that is notified of reception of the data frame stores the received data frame in priority transfer buffer 104 when it is determined that the data frame needs to be transferred by priority transfer. Here, the priority transfer means to transfer preferentially a data frame in which a real time property is required.

Wireless communication interface 105 includes wireless MAC processing section 106 and wireless PHY processing section 107.

Wireless MAC processing section 106 performs an access control process on a wireless communication media or a MAC layer process on a reception frame acquired from wireless PHY processing section 107. In addition, wireless MAC processing section 106 performs a process of notifying bridge control section 102, a process of storing a received data frame in normal transfer buffer 103 or priority transfer buffer 104 according to an instruction from bridge control section 102, a MAC layer process on a data frame or a beacon frame output from normal transfer buffer 103 or priority transfer buffer 104 according to an instruction from bridge control section 102, a process of outputting to wireless PHY processing section 107, and the like.

Wireless PHY processing section 107 performs a physical layer process such as data transmission/reception to/from a wireless communication media, modulation/demodulation, encoding, and the like.

Wide area network interface 108 includes wide area network MAC processing section 109 and wide area network PHY processing section 110.

Wide area network MAC processing section 109 performs an access control process on the WAN, and a MAC layer process on a reception frame acquired from wide area network PHY processing section 110. In addition, wide area network MAC processing section 109 performs a process of notifying bridge control section 102, a process of storing a received data frame in normal transfer buffer 103 or priority transfer buffer 104 according to an instruction from bridge control section 102, a MAC layer process on a data frame output from normal transfer buffer 103 or priority transfer buffer 104 according to an instruction from bridge control section 102, a process of outputting to wide area network PHY processing section 110, and the like.

Wide area network PHY processing section 110 performs a physical layer process such as data transmission/reception to/from the WAN, modulation/demodulation, encoding, and the like.

Examples of the wide area network include Ethernet (registered trademark), ADSL, optical communication, WCDMA, WiMAX, and LIE.

Figure 2:
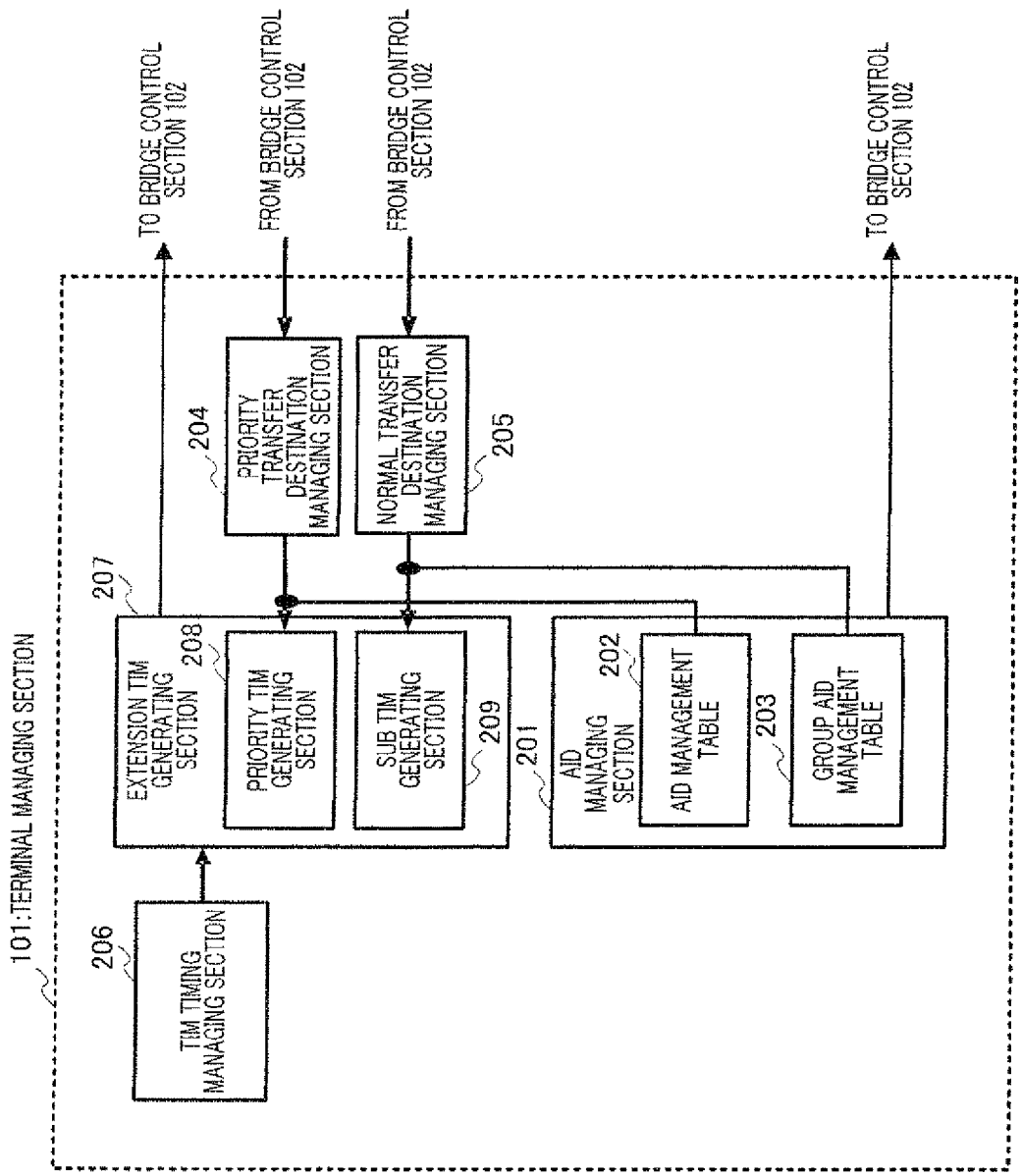
FIG. 2 is a block diagram illustrating an internal configuration of a terminal managing section.

FIG. 2 is a block diagram illustrating an internal configuration of terminal managing section 101 illustrated in FIG. 1. In FIG. 2, terminal managing section 101 includes AID managing section 201, priority transfer destination managing section 204, normal transfer destination managing section 205, TIM timing managing section 206, and extension TIM generating section 207. The internal configuration of terminal managing section 101 will be described below with reference to FIG. 2.

AID managing section 201 functions as a group managing means for dividing the TIMs for the wireless LAN terminals that have associated with access point 100 into a plurality of groups and then transmitting the TIMs. AID managing section 201 includes AID management table 202 and group AID management table 203.

When accepting the association request from the wireless LAN terminal, AID management table 202 allocates an AID to the wireless LAN terminal, and manages the AID. FIG. 3 illustrates an example of AID management table 202. In the example of FIG. 3, AIDs 1 to 7 are allocated to wireless LAN terminals 1 to 7, respectively.

Group AID management table 203 classifies the AIDs which AID managing section 201 allocates to the wireless LAN terminals into a plurality of sub groups, and manages the grouped AIDs. Group AID management table 203 newly associates the classified sub groups with a group association identifier (GAID), and manages the GAM. FIG. 4 illustrates an example of group AID management table 203. In the example of FIG. 4, the AIDs are classified into a sub group of AIDs 1, 4, and 7, a sub group of AIDs 1, 2, and 5, and a sub group of AIDs 1, 3, and 6. Further, in the example of FIG. 4, the sub group of AIDs 1, 4, and 7 is associated with GAID 1, the sub group of AIDs 1, 2, and 5 is associated with GAID 2, and the sub group of AIDs 1, 3, and 6 is associated with GAID 3.

Priority transfer destination managing section 204 manages a transfer destination when the data frame received via wireless communication interface 105 or wide area network interface 108 needs to be transferred by the priority transfer. Specifically, priority transfer destination managing section 204 associates the destination extracted from the received data frame by bridge control section 102 with the AID when the priority transfer is necessary, and manages the transfer destination. Further, priority transfer destination managing section 204 newly adds an entry when the priority transfer to a destination other than the destination which is already under its management has been performed. Further, when a communication session requiring the priority transfer to a certain destination is finished, priority transfer destination managing section 204 deletes a corresponding destination entry.

Normal transfer destination managing section 205 associates a destination, which is not managed by priority transfer destination managing section 204 among wireless LAN terminals that has associated with the access point 100, with the AID, and manages the transfer destination. When the priority transfer to the destination which is under management starts, normal transfer destination managing section 205 deletes the corresponding entry. Further, when the entry is deleted from priority transfer destination managing section 204 but the entry is the wireless LAN terminal which continuously is accommodated in the access point, normal transfer destination managing section 205 adds the corresponding entry.

TIM timing managing section 206 manages timing of generating and transmitting the TIM. Since the TIM is transmitted in a form included in the beacon, TIM timing managing section 206 instructs extension TIM generating section 207 to generate the TIM before the beacon is transmitted.

Extension TIM generating section 207 generates the TIM indicating that data addressed to the wireless LAN terminal is stored. Extension TIM generating section 207 includes priority TIM generating section 208 and sub TIM generating section 209.

Priority TIM generating section 208 sets a corresponding bit on the destination of the data frame, which needs the priority transfer, managed by priority transfer destination managing section 204, and generates a priority TIM. Priority TIM generating section 208 updates the priority TIM when the destination information managed by priority transfer destination managing section 204 is updated.

Sub TIM generating section 209 generates the TIM on the destination of the data frame which is to be subjected to the normal transfer. That is, sub TIM generating section 209 generates the TIM on the destination managed by normal transfer destination managing section 205. Sub TIM generating section 209 manages on which group AID the sub TIM has been generated the previous time. When TIM generation timing is instructed from TIM timing managing section 206, sub TIM generating section 209 generates the sub TIM for the wireless LAN terminal belonging to the next group AID. Sub TIM generating section 209 determines whether or not the data frame addressed to the wireless LAN terminal belonging to the corresponding group AID is buffered, and sets the corresponding bit of the TIM when it is determined that the data frames is buffered.

When the priority TIM and the sub TIM are generated, extension TIM generating section 207 is notified of TIM generation timing from TIM timing managing section 206. Then, extension. TIM generating section 207 generates an extension TIM by synthesizing the priority TIM generated by priority TIM generating section 208 with the sub TIM generated by sub TIM generating section 209, and outputs the extension TIM to bridge control section 102.

Even though not shown, access point 100 may have a user interface function that allows an operator to select and execute an operation of the access point. For example, the user interface function includes a key, a display, a codec, a microphone, a speaker, a camera, a vibrator, a memory, and the like.

Figure 5:
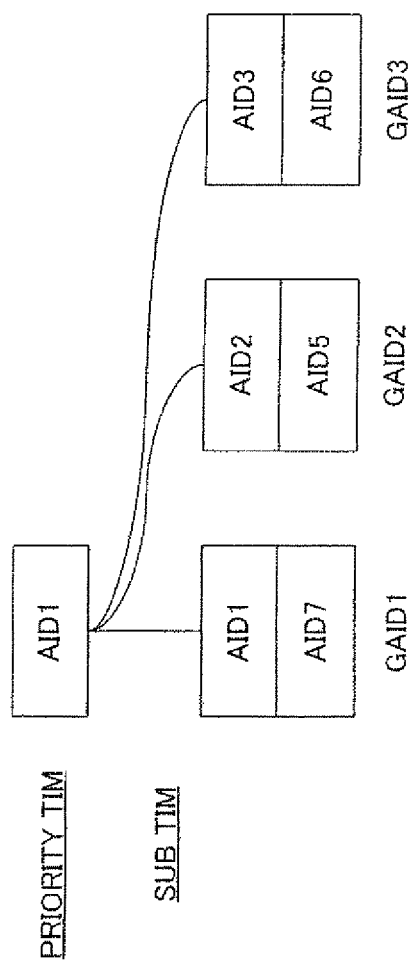
FIG. 5 illustrates a configuration example of an extension TIM according to an embodiment of the present invention.

FIG. 5 illustrates a configuration example of the extension TIM according to an embodiment of the present invention. A wireless LAN terminal of AID1 is the destination of the data frame that the priority transfer requires, a TIM in which a bit corresponding to the wireless LAN terminal of AID1 is set to 1 is registered as the priority TIM. Meanwhile, 1 is set to a sub TIM whose group AID is GAID 1, as bits corresponding to wireless LAN terminals which are the destinations of the data frames buffered in the normal transfer buffer among wireless LAN terminals belonging to GAID 1.

Here, bits corresponding to wireless LAN terminals of AID1 and AID7 are set. Similarly, bits corresponding to wireless LAN terminals of AID2 and AID5 are set to a sub TIM of group AID2, and bits corresponding to wireless LAN terminals of AID3 and AID6 are set to a sub TIM of group AID3.

The extension TIM is a logical sum of the priority TIM and the sub TIM. That is, bits corresponding to wireless LAN terminals AID1 and AID7 are set to the extension TIM of group AID1. Further, bits corresponding to wireless LAN terminals AID1, AID2, and AID5 are set to the extension TIM of group AID2. Further, bits corresponding to wireless LAN terminals AID1, AID3, and AID6 are set to the extension TIM of group AID3.

Figure 6:
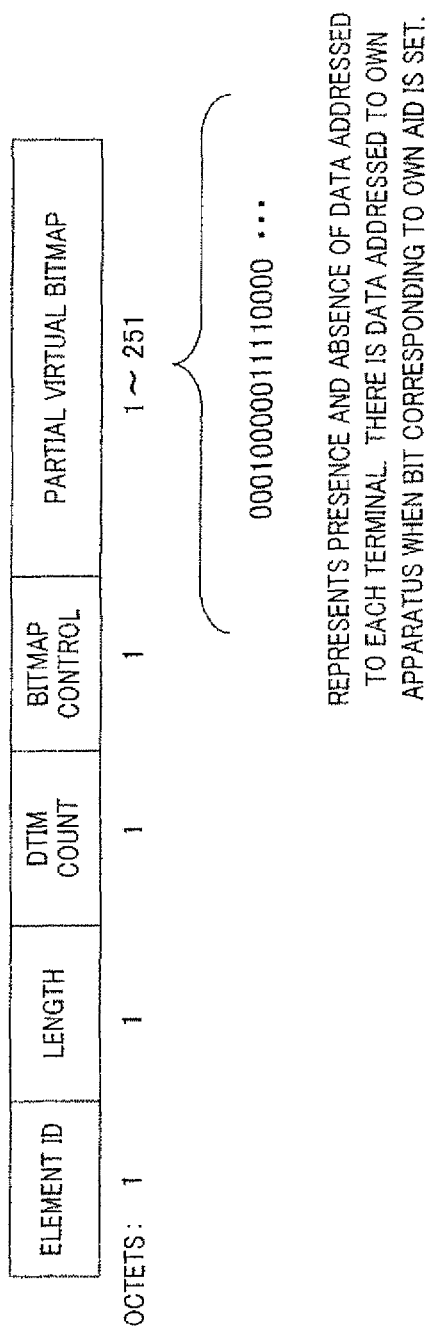
FIG. 6 illustrates an example of a data format of an extension TIM.

FIG. 6 illustrates an example of a data format of the extension TIM, and bits corresponding to a wireless LAN terminal of a partial virtual bitmap field are set.

Figure 7:
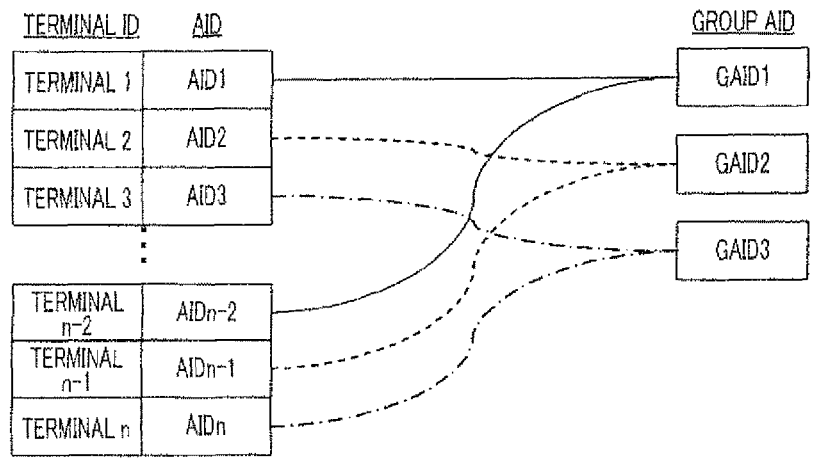
FIG. 7 illustrates a configuration example of a group AID according to an embodiment of the present invention.

FIG. 7 illustrates a configuration example of the group AID according to an embodiment of the present invention. Here, a terminal ID refers to a MAC address of a wireless LAN terminal that has transmitted the association request to access point 100. Further, an AID refers to an identifier that is allocated to each wireless LAN terminal when access point 100 has accepted the association request, and the AID is applied by adding one starting from 1. Further, a group AID refers to a newly applied identifier in order to classify AIDs into sub groups. The group AID is applied by adding one starting from 1.

In the example of FIG. 7, AID1=1 is allocated to wireless LAN terminal 1, AID2=2 is allocated to wireless LAN terminal 2, and AIDn=n is allocated to wireless LAN terminal n. In the example of FIG. 7, the group AIDs are classified into three, and the group AIDs are classified according to a remainder obtained by dividing the AIDs by 3 that is the number of groups, that is, according to a result of (AID Mod 3). Specifically, wireless LAN terminal 1, wireless LAN terminal 4, . . . , and wireless LAN terminal n-2 are assigned to GAID 1 (=1). Further, wireless LAN terminal 2, wireless LAN terminal 5, . . . , and wireless LAN terminal n-1 are assigned to GAID 2 (=2). Further, wireless LAN terminal 3, wireless LAN terminal 6, . . . , and wireless LAN terminal n are assigned to GAID 3 (=3). Further, wireless LAN terminals belonging to the group AID can be appropriately changed. For example, a change can be made so that wireless LAN terminals which are performing communication can belong to the same group AID. That is, in the present invention, the group AIDs can be reconfigured according to communication condition of the wireless LAN terminal.

Figure 8:
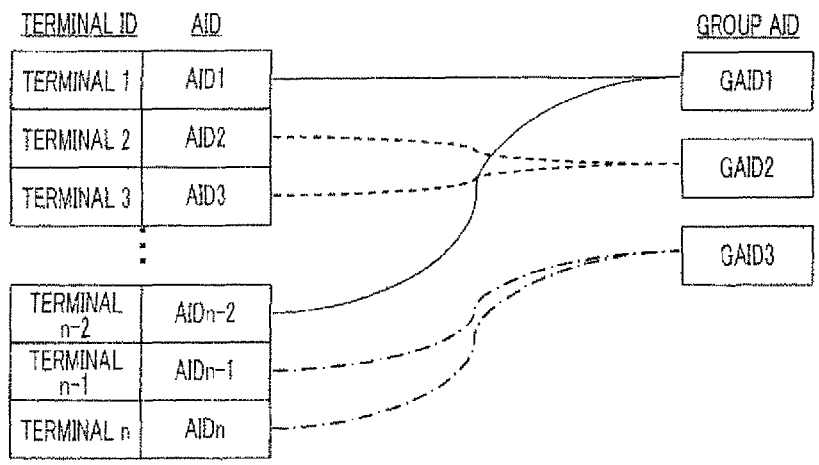
FIG. 8 illustrates an aspect in which a configuration of a group AIDs is changed.

FIG. 8 illustrates a changing situation of a configuration of the group AIDs. FIG. 8 illustrates a changing situation of the group AID from the configuration illustrated in FIG. 7, so as to belong to GAID 2 that is the same group AID, because of the communication establishment between wireless LAN terminal 2 and wireless LAN terminal 3.

Wireless LAN terminal 3 initially belongs to GAID 3 but is reclassified to GAID 2 where wireless LAN terminal 2 belongs, because communication is established with wireless LAN terminal 2. In this example, wireless LAN terminal n-1, which has not established communication with another wireless LAN terminal belonging to AID management table 202, is changed so as to belong to GAID 3 for load balancing. Further, the group AIDs are classified to disperse the load according to communication condition of the wireless LAN terminal.

Here, although the group AIDs are classified into three of GAID 1 to GAID 3, the present invention is not limited to this, and it is equally possible to classify the group AIDs into five or ten. However, if the number of classifications is excessive, an effect of allocating the group AID is reduced, so that it is necessary to fix the number of classifications to a moderate number.

Figure 9:
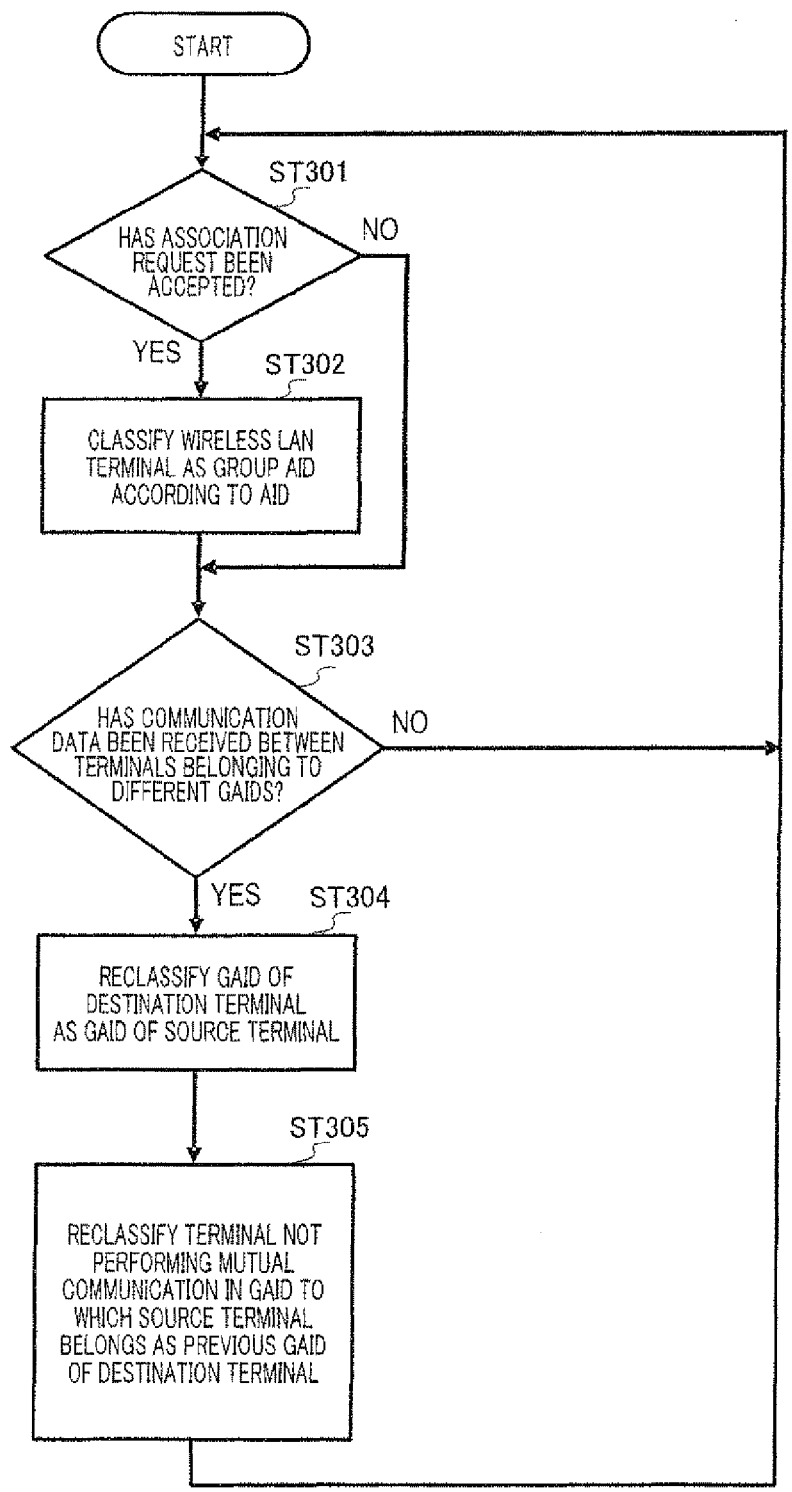
FIG. 9 is a flowchart illustrating a group AID classifying process according to an embodiment of the present invention.

FIG. 9 is a flowchart illustrating a group AID classifying process according to an embodiment of the present invention. In this figure, in step (hereinafter, abbreviated as "ST") 301, when an association request is received from a wireless LAN terminal, access point 100 determines whether or not the association request has been accepted through bridge control section 102. The step proceeds to ST302 when it is determined that access point 100 has accepted the association request (YES), but the step proceeds to ST303 when it is determined that access point 100 has not accepted the association request (NO).

In ST302, AID managing section 201 applies an AID to a wireless LAN terminal whose association request has been accepted, and classifies the wireless LAN terminal to a group AID to belong according to the AID. Here, the group AIDs are classified into three. GAID 1 is assigned when AID Mod 3=1 holds, GAID 2 is assigned when AID Mod 3=2 holds, and GAID 3 is assigned when AID Mod 3=0 holds.

In ST303, when a received data frame is a data frame to be transferred via wireless communication interface 105, bridge control section 102 instructs AID managing section 201 to perform a GAID determination process. Next, AID managing section 201 determines whether or not a source wireless LAN terminal and a destination wireless LAN terminal belong to different group AIDs. Next when it is determined that the source wireless LAN terminal and the destination wireless LAN terminal belong to different group AIDs (ST303: YES), the group AID classifying process proceeds to ST304. However, when it is determined that the source wireless LAN terminal and the destination wireless LAN terminal do not belong to different group AIDs, that is, they belong to the same group AID (ST303: NO), the group AID classifying process returns to ST301.

In ST304, AID managing section 201 reclassifies the group AID where the destination wireless LAN terminal belongs to the group AID where the source wireless LAN terminal belongs. In the example of FIG. 8, terminal 3 that has belonged to GAID 3 is changed to belong to GAID 2.

In ST305, AID managing section 201 extracts a wireless LAN terminal that is not performing mutual communication, from the group AID to which the source wireless LAN terminal belongs. Next, AID managing section 201 reclassifies the extracted wireless LAN terminal that is not performing mutual communication to the group AID to which the changed wireless LAN terminal has belonged, by the number of wireless LAN terminals changed in ST304, In the example of FIG. 8, terminal n-1 that has belonged to GAID 2 is changed to belong to GAID 3.

Through this process, in the present embodiment, it is possible to classify the wireless LAN terminals into a plurality of group AIDs. Further, in the present embodiment, it is possible to reclassify the group AID according to communication condition, so that it is possible to classify the wireless LAN terminals communicating each other to the same group AID. In particular, the present embodiment classifies the wireless LAN terminals which are associated with access point 100 and performing communication with each other via access point 100 to the same group AID. By this means, in the present embodiment, since the wireless LAN terminals can transition to the awake mode in the same session, it is possible to suppress an increase of data transfer delay.

In the above description, at the time of reclassification, the group AID of the destination is changed to the group AID of the source. However, the group AID of the source may be changed to the group AID of the destination. Further, at the time of reclassification by ST305, the process of reclassifying as the group AID to which the wireless LAN terminal changed in ST304 has belonged may be performed only for the destination of the data frame buffered in normal transfer buffer 103. That is, in the present embodiment, it is not necessary to perform the process of ST305 if the buffered data frame is other than wireless LAN terminals which are performing communications each other or if the buffered data frame is not addressed to the wireless LAN terminal belonging to the corresponding group AID.

Figure 10:
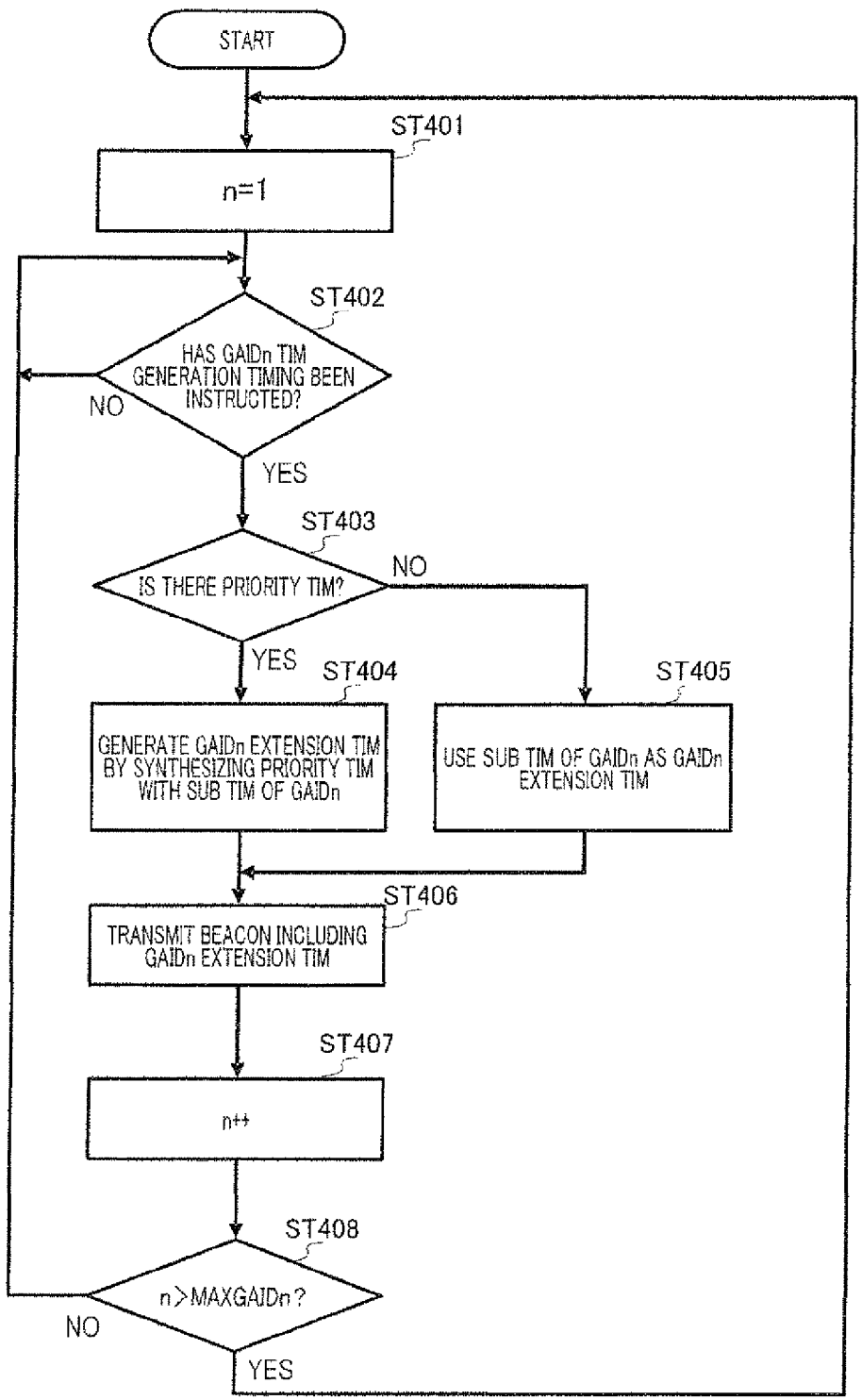
FIG. 10 is a flowchart illustrating an extension TIM generating process according to an embodiment of the present invention.

FIG. 10 is a flowchart illustrating an extension TIM generating process according to an embodiment of the present invention. In this figure, in ST401, extension TIM generating section 207 initializes a management variable n (n=1) for generating the extension TIM through an initialization sequence such as a process of powering on the access point and a apparatus reset process.

In ST402, extension TIM generating section 207 determines whether or not TIM timing managing section 206 instructs TIM generation timing. When there is an instruction of TIM generation timing (ST402:YES), the extension TIM generating process proceeds to step ST403. Meanwhile, when there is no instruction of TIM generation timing (ST402: NO), extension TIM generating section 207 repeats the process of ST402. That is, in ST402, extension TIM generating section 207 waits for an instruction of TIM generation timing.

In ST403, extension TIM generating section 207 determines whether or not there is a priority TIM managed by priority TIM generating section 208. When there is the priority TIM (ST403:YES), the extension TIM generating process proceeds to ST404. However, when there is no priority TIM (ST403: NO), the extension TIM generating process proceeds to ST405.

In ST404, extension TIM generating section 207 generates an extension TIM by synthesizing the priority TIM with the sub TIM on the group AID corresponding to the management variable. In the example of FIG. 5, when the management variable is 1, the priority TIM to which the bit corresponding to AID1 is set is synthesized with the sub TIM to which the bits corresponding to AID1 and AID7 are set, so that an extension TIM to which AID1 and AID7 are set is generated. In the example of FIG. 7, AID1, AID4, AID7, . . . , and AIDn-2 belong to LAID 1. However, the data frames buffered in normal transfer buffer 103 and priority transfer buffer 104 are only the data frame addressed to wireless LAN terminals corresponding to AID1 and AID7. Thus, bits corresponding to AID4 and AIDn-2 are not set.

In sT405, extension TIM generating section 207 uses the sub TIM for the group AID corresponding to the management variable as the extension TIM.

In ST406, extension TIM generating section 207 outputs the generated extension TIM to bridge control section 102, and bridge control section 102 generates a beacon including the extension TIM, and outputs the beacon to be transmitted from wireless communication interface 105.

In ST407, extension TIM generating section 207 adds one to the management variable. In ST408, extension TIM generating section 207 determines whether or not the added management variable exceeds the number of group AIDs. When it is determined that the added management variable exceeds the number of group AIDs (ST408: YES), the extension TIM generating process returns to ST401. Meanwhile, when the management variable is initialized to 1 and it is determined that the added management variable does not exceed the number of group AIDs (ST408: NO), the extension TIM generating process returns to ST402, and extension TIM generating section 207 waits for an instruction of TIM generation timing.

Figure 11:
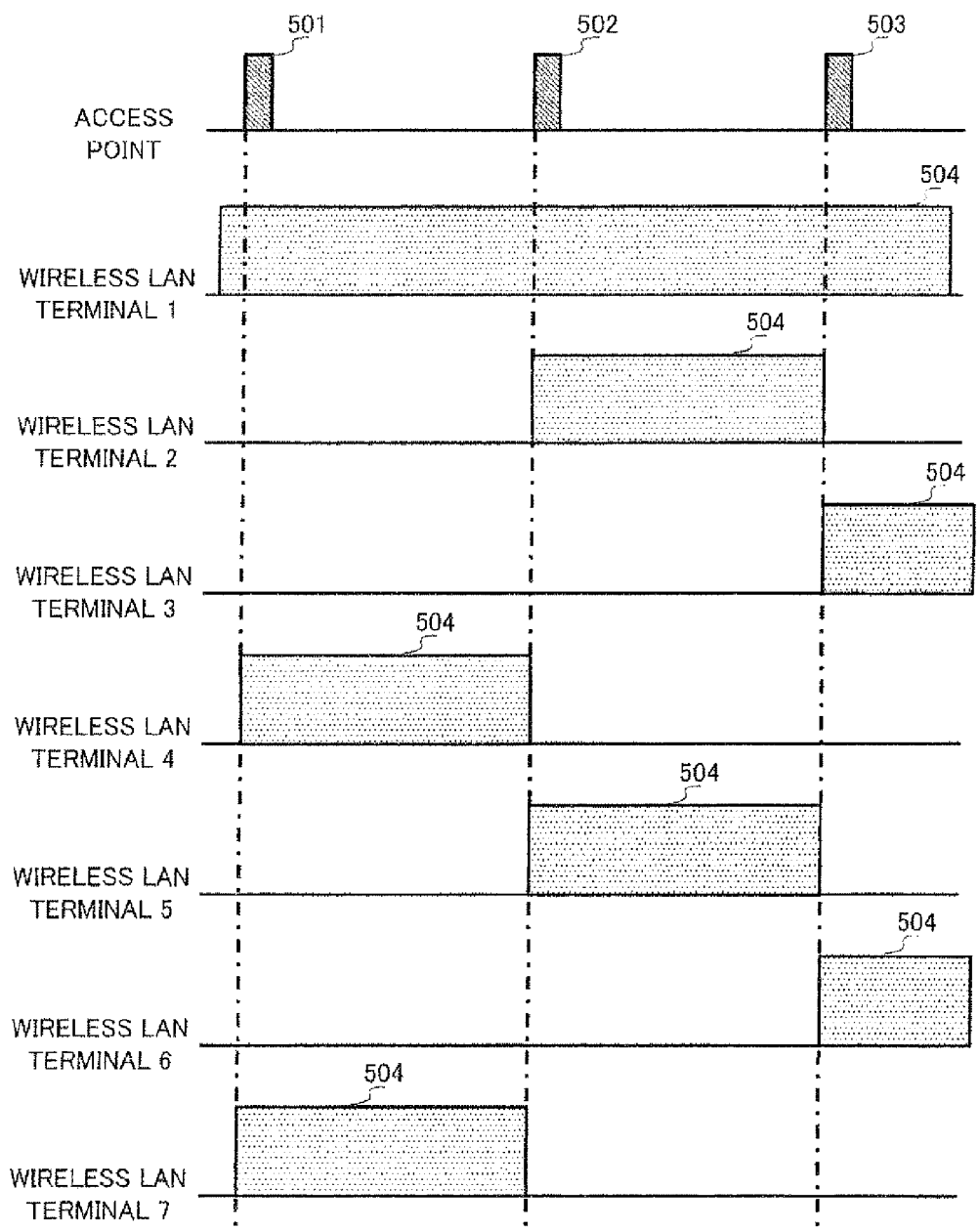
FIG. 11 illustrates an operation example of a wireless LAN terminal by an extension TIM.

FIG. 11 illustrates an operation example of the wireless LAN terminal based on the extension TIM notified through the above process. In FIG. 11, reference numeral 501 represents a beacon including an extension TIM addressed to GAID 1, reference numeral 502 represents a beacon including an extension TIM addressed to GAID 2, and reference numeral 503 represents a beacon including an extension TIM addressed to GAID 3.

Bits corresponding to wireless LAN 1, wireless LAN 4, and wireless LAN 7 are set to the extension TIM addressed to GAID 1. Bits corresponding to wireless LAN 1, wireless LAN 2, and wireless LAN 5 are set to the extension TIM addressed to GAID 2. Bits corresponding to wireless LAN 1, wireless LAN 3, and wireless LAN 6 are set to the extension TIM addressed to GAID 3.

For wireless LAN terminal 1, the extension TIMs included in beacons 501 to 503 represent the presence of data Thus, wireless LAN terminal 1 operates in the awake mode when any one of the beacons is received, transmits a delivery request for requesting the access point to deliver the buffered data, and then receives the buffered data. Reference numeral 504 represents that each wireless LAN terminal is in the awake mode.

Wireless LAN terminals 4 and 7 request data delivery after receiving beacon 501, and then receives the buffered data since the extension TIM included in beacon 501 represents the presence of data. The remaining wireless LAN terminals enter the awake mode only during a session indicating the presence of data by the extension TIM, and then requests data delivery.

In FIG. 11, a session in which the wireless LAN terminal is in the awake mode corresponds to an interval between the beacons. Since data delivery is completed before the next beacon, the wireless LAN terminal recognizes the absence of buffered data by receiving a data frame whose more data flag is zero (0) from the access point. In this case, the wireless LAN terminal may enter the doze mode before receiving the next beacon. Further, when the wireless LAN terminal receives a data frame whose more data flag is 1 from the access point even after receiving the next beacon and recognizes that there is still buffered data, the wireless LAN terminal can continuously stay in the awake mode.

Through the above process, in the present embodiment, it is possible to dispersedly notify the presence and absence of buffered data addressed to the wireless LAN terminal. By this means, in the present embodiment, it is possible to prevent the data delivery requests of the wireless LAN terminals operating in the doze mode from being concentrated, and reduce the data delivery standby time in the wireless LAN terminal. Thus, it is possible to reduce power consumption of the wireless LAN terminal. Further, data requiring the priority transfer may be excluded from a target of dispersed notification. In this case, notification can be made constantly for the data requiring the priority transfer, and thus an increase in the transfer delay can be prevented.

Next, a description will be made in connection with a group AID reconfiguring process. The group AID reconfiguring process starts when AID managing section 201 detects an event, unlike group AID reclassification. For example, the event refers to when a predetermined time or more elapses after a previous group AID is configured, when communication is newly established, when established communication is terminated, or the like.

Figure 12:
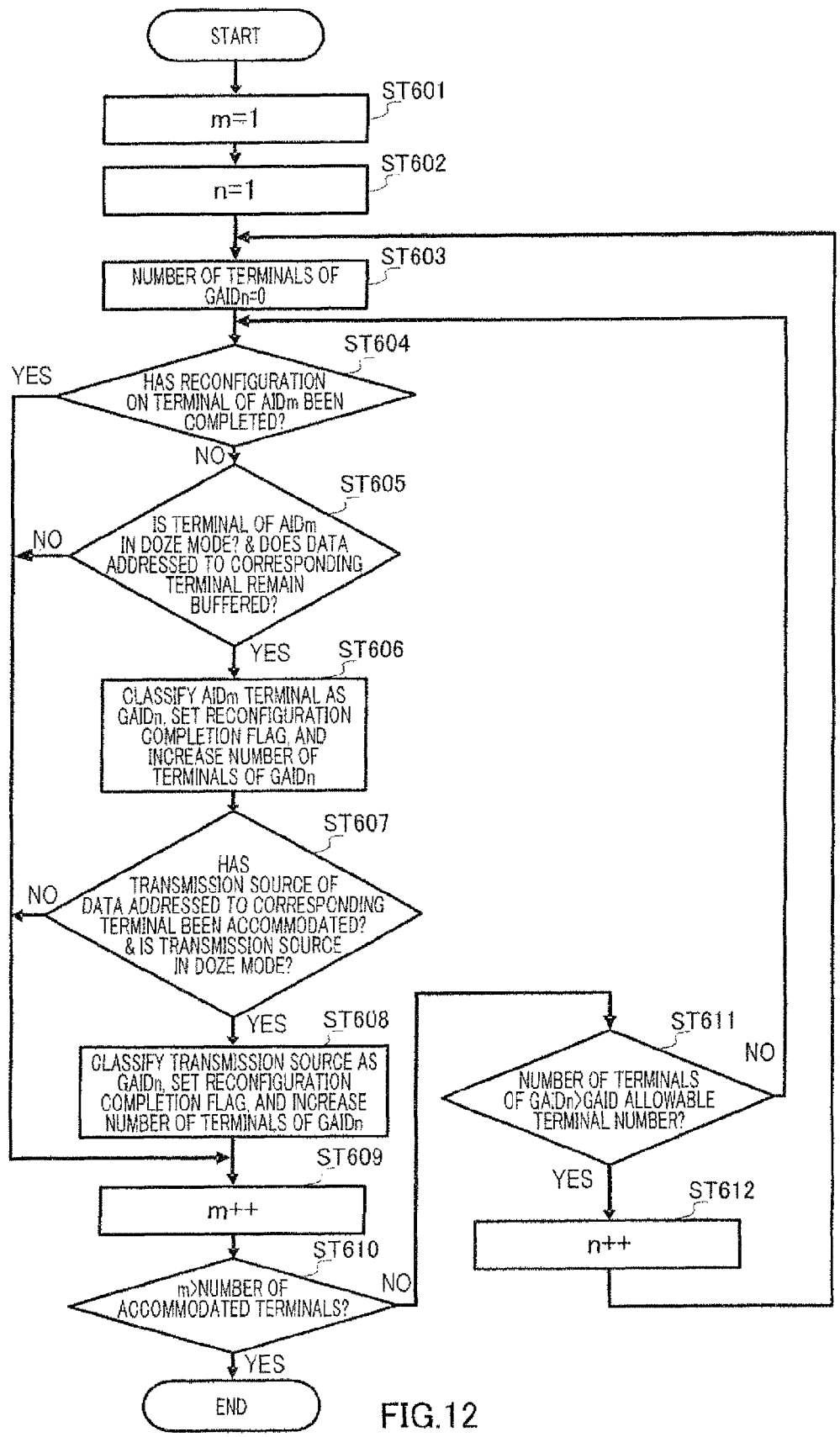
FIG. 12 is a flowchart illustrating a procedure of a group AID reconfiguring process according to an embodiment of the present invention.

FIG. 12 is a flowchart illustrating a procedure of the group AID reconfiguring process according to an embodiment of the present invention. In ST601, when an event occurs, AID managing section 201 initializes an AID management variable m for reconfiguring the group AID to 1.

In ST602, AID managing section 201 initializes the group AID management variable n for reconfiguring the group AID to 1. In ST603, AID managing section 201 initializes a variable for managing the number of wireless LAN terminals belonging to GAID n to zero (0).

In ST604, AID managing section 201 determines whether or not the reconfiguring process on the group AID of the wireless LAN terminal corresponding to AIDm has been completed. When it is determined that the reconfiguring process on the group AID of the wireless LAN terminal corresponding to AIDm has been completed (ST604: YES), the group AID reconfiguring process procedure proceeds to step sT609. However, when it is determined that the reconfiguring process on the group AID of the wireless LAN terminal corresponding to AIDm has not been completed (ST604: NO), the group AID reconfiguring process procedure proceeds to step ST605.

In ST605, AID managing section 201 determines whether or not the corresponding wireless LAN terminal is operating in the doze mode and data addressed to the corresponding wireless LAN terminal is buffered in any one of normal transfer buffer 103 and priority transfer buffer 104. When it is determined to be buffered (ST605: YES), the group AID reconfiguring process procedure proceeds to ST606. However, when it is determined not to be buffered (ST605: NO), the group AID reconfiguring process procedure proceeds to ST609.

In ST606, AID managing section 201 classifies the wireless LAN terminal corresponding to AIDm to GAID n, applies a reconfiguration completion flag to Alain, and adds one to the terminal number management variable of GAID n.

In ST607, AID managing section 201 determines whether or not the access point has applied an AID to the transmission source of the buffered data frame addressed to the reconfigured wireless LAN terminal and the transmission source is in the doze mode. That is, AID managing section 201 manages the AID where the access point is applied, by using AID management table 202. When this condition is satisfied (ST607: YES), the group AID reconfiguring process procedure proceeds to ST 608. However, when this condition is not satisfied (ST607: NO), the group AID reconfiguring process procedure proceeds to ST 609.

In ST608, AID managing section 201 classifies the source wireless LAN terminal to GAID n, applies the reconfiguration completion flag, and adds one to the terminal number management variable of GAID n. In ST609, AID managing section 201 adds one to the AID management variable m.

In ST610, AID managing section 201 determines whether or not the AID management variable m added in ST609 is larger than the number of accommodated wireless LAN terminals (the number of accommodated terminals), that is, the number of entries of AID management table 202. When the AID management variable m is larger than the number of accommodated terminals (YES), the group AID reconfiguring process is finished, however, when the AID management variable m is equal to or less than the number of accommodated terminals (NO), the group AID reconfiguring process proceeds to ST611.

In ST611, AID managing section 201 determines whether or not the number of terminals of GAID n is larger than the number of a group AID allowable terminal. When the number of terminals of GAID n is larger than the number of the group AID allowable terminal (ST611: YES), the group AID reconfiguring process procedure proceeds to ST 612. However, when the number of terminals of GAID n is not larger than the number of the group AID allowable terminal (ST611: NO), the group AID reconfiguring process procedure returns to ST 604. The number of the group AID allowable terminal is managed by AID managing section 201. The number of the group AID allowable terminal may be a fixed value such as 3, 5, or 10, may be based on a calculation result such as "the number of AID/the number of group AID", or may have a changeable value.

In ST612, in order to perform classification on the next group AID, AID managing section 201 adds one to the group AID management variable n, and then the group AID reconfiguring process procedures returns to ST603.

As described above, in the present embodiment, through the above process, it is possible to reconfigure the group AID used for dispersedly notifying of the presence and absence of the buffered data addressed to the wireless LAN terminal. As a result, in the present embodiment, the presence and absence of the buffered data can be notified constantly based on the latest data buffer condition. Thus, in the present embodiment, it is possible to prevent the data delivery requests of the wireless LAN terminals operating in the doze mode from being concentrated, and reduce the data delivery standby time in the wireless LAN terminal. Thus, it is possible to reduce power consumption of the wireless LAN terminal.

The wireless communication apparatuses illustrated in FIGS. 1 and 2 can be represented as follows by high-order conceptualization. That is, a wireless communication apparatus according to the present invention is a wireless communication apparatus that relays communication between a wireless communication terminal apparatus and another communication terminal apparatus, and employs a configuration including a group managing section that divides wireless communication terminal apparatuses associated with the wireless communication apparatus into a plurality of groups and manages the grouped wireless communication terminal apparatuses, a storage section that stores data addressed to the wireless communication terminal apparatus, acquired from the another communication terminal apparatus, a data storage notification signal generating section that generates a data storage notification signal indicating that data addressed to the wireless communication terminal is stored for each group, and a transmitting section that transmits the generated data storage notification signal to the wireless communication terminal apparatus at timing shifted for each group.

Figure 13:
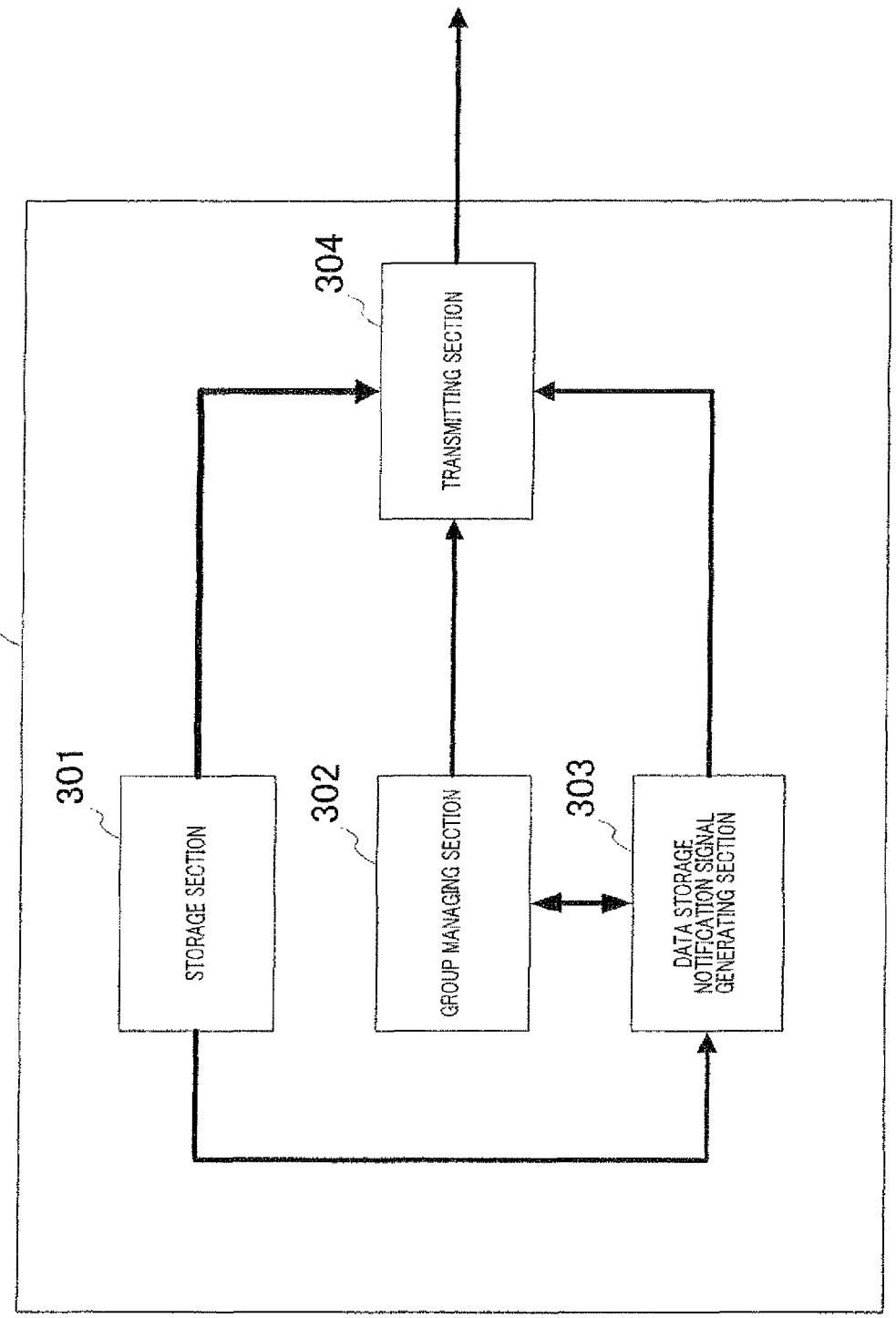
FIG. 13 is a block diagram illustrating another configuration of a wireless communication apparatus according to an embodiment of the present invention.

FIG. 13 illustrates this configuration in details. Referring to FIG. 13, wireless communication apparatus 300 includes storage section 301, group managing section 302, data storage notification signal generating section 303, and transmitting section 304.

Group managing section 302 divides wireless communication terminal apparatuses subordinate to wireless communication apparatus 300 into a plurality of groups, and manages grouped wireless communication terminal apparatuses. Group managing section 302 corresponds to a part of terminal managing section 101 of FIG. 1, bridge control section 102 of FIG. 1, and AID managing section 201 of FIG. 2.

Storage section 301 stores data addressed to the wireless communication terminal apparatus acquired from another communication terminal apparatus. Storage section 301 corresponds to normal transfer buffer 103 and priority transfer buffer 104 in FIGS. 1 and 2.

Data storage notification signal generating section 303 generates a data storage notification signal indicating that data addressed to the wireless communication terminal apparatus is stored, for each of the group. Data storage notification signal generating section 303 corresponds to a part of terminal managing section 101 of FIG. 1, bridge control section 102 of FIG. 1, and extension TIM generating section 207 of FIG. 2, and TIM timing managing section 206 of FIG. 2.

Transmitting section 304 transmits the generated data storage notification signal to the wireless communication terminal apparatus at timing shifted for each of the group. Transmitting section 304 corresponds to wireless communication interface 105 of FIG. 1.

As described above, in the present embodiment, wireless LAN terminals associated with the access point are divided into a plurality of groups and managed using the group AID, and the TIM indicating that data addressed to the wireless LAN terminal is stored is transmitted at timing shifted for each of the group. As a result, in the present embodiment, it is possible to prevent the data delivery requests of the wireless LAN terminals from being concentrated, and to reduce the data delivery standby time in the wireless LAN terminal. Thus, it is possible to reduce power consumption of the wireless LAN terminal.

The present embodiment has been described under the assumption that the wireless communication interface is used for the wireless LAN. However, the present invention can be applied to any system that allocates one equivalent to the association ID, and accommodates a terminal and performs communication, and the present invention is not limited to the wireless LAN. For example, the wireless communication interface may be use for a wireless communication system such as Bluetooth, Zigbee, or WiMAX.

Further, in the present embodiment, although a wireless LAN access point has been described as a wireless communication apparatus as an example, the present invention is not limited to this, and the present invention is effective for any network system notifying of the presence and absence of data addressed to a specific terminal, or the like. The wireless communication apparatus can be applied to mobile WiMAX base stations, LTE base stations, femto cell base stations, home broadband routers, and the like.

Further, the access point according to the present embodiment can be applied to wireless LAN terminals temporarily operating as an access point, wireless LAN cards, USB type wireless LAN apparatuses, and the like.

Further, the present embodiment has been described in connection with the example in which wireless LAN terminals perform communication with each other via the access point, however, the present invention is not limited to this. As communication counterparts, for example, a wireless LAN terminal associated with the access point and a communication terminal connected to the access point in a wired or wireless manner may perform communication with each other. Further, the communication terminal may be subordinate to the access point or may not be subordinate to the access point.

Bridge control section 102, normal transfer buffer 103, priority transfer buffer 104, wireless communication interface 105, wide area network interface 108, AID managing section 201, priority transfer destination managing section 204, normal transfer destination managing section 205, TIM timing managing section 206, and extension TIM generating section 207, which are illustrated in FIGS. 1 and 2, are typically implemented as LSIs which are integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be regenerated is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2010-139641, filed on Jun. 18, 2010, including the specification, drawings and abstract, is incorporated herein by reference in its entirety.

INDUSTRIAL APPLICABILITY

The wireless communication apparatus and the wireless communication control method according to the present invention can be applied to mobile WiMAX base stations, LTE base stations, femto cell base stations, home broadband routers, and the like.

REFERENCE SIGNS LIST

101 Terminal managing section
102 Bridge control section
103 Normal transfer buffer
104 Priority transfer buffer
105 Wireless communication interface
106 Wireless MAC processing section
107 Wireless PHY processing section
108 Wide area network interface
109 Wide area network MAC processing section
110 Wide area network PHY processing section
201 AID managing section
202 AID management table
203 Group AID management table
204 Priority transfer destination managing section
205 Normal transfer destination managing section
206 TIM timing managing section
207 Extension TIM generating section
208 Priority TIM generating section
209 Sub TIM generating section
301 Storage section
302 Group managing section
303 Data storage notification signal generating section
304 Transmitting section

The invention claimed is:

1. A wireless communication apparatus that relays communication between a wireless communication terminal apparatus and another communication terminal apparatus, comprising:
    a group managing section that stores a table indicating, for each of the wireless communication terminal apparatuses associated with the wireless communication apparatus, which one or more of groups to which the wireless communication terminal apparatus belongs;
    a storage section that stores data addressed to the wireless communication terminal apparatus acquired from the other communication terminal apparatus;
    a data storage notification signal generating section that generates a data storage notification signal indicating that data addressed to the wireless communication terminal apparatus is stored for each group based on the table; and
    a transmitting section that transmits the generated data storage notification signal to the wireless communication terminal apparatus at a timing shifted for each of the groups,
    wherein the group managing section determines whether or not the wireless communication terminal apparatus and the other communication terminal apparatus, which are associated with the wireless communication apparatus and communicating with each other, belong to the different groups separately and classifies the wireless communication terminal apparatus and the other communication terminal apparatus into the same group when the wireless communication terminal apparatus and the other communication terminal apparatus belong to the different groups separately, and
    wherein the data storage notification signal generating section adds information indicating priority transfer to the data storage notification signal when data addressed to the wireless communication terminal apparatus needs to be preferentially transferred.

2. The wireless communication apparatus according to claim 1, wherein the group managing section reconfigures the group according to communication condition of the wireless communication terminal apparatus.

3. A wireless communication control method of a wireless communication apparatus that relays communication between a wireless communication terminal apparatus and another communication terminal apparatus, comprising:
    a storage step of storing data addressed to the wireless communication terminal apparatus, the data acquired from the other communication terminal apparatus;
    a data storage notification signal generating step of generating, based on a stored table indicating, for each of the wireless communication terminal apparatuses associated with the wireless communication apparatus, to which one or more of groups the wireless communication terminal apparatus belongs, a data storage notification signal indicating that data addressed to the wireless communication terminal apparatus is stored for each of the groups;
    a transmitting step of transmitting the generated data storage notification signal to the wireless communication terminal apparatus at a timing shifted for each of the groups;
    a determining step of determining whether or not the wireless communication terminal apparatus and the other communication terminal apparatus, which are associated with the wireless communication apparatus and communicate with each other, belong to different ones of the groups separately;
    a classifying step of classifying the wireless communication terminal apparatus and the other communication terminal apparatus into the same group when the wireless communication terminal apparatus and the other communication terminal apparatus belong to the different ones of the groups separately; and
    an information adding step of adding information indicating priority transfer to the data storage notification signal when data addressed to the wireless communication terminal apparatus needs to be preferentially transferred.

4. The wireless communication control method according to claim 3 further comprising group managing step of reconfiguring a group according to communication condition of the wireless communication terminal apparatus.

* * * * *